US007593991B2

(12) United States Patent
Friedman et al.

(10) Patent No.: US 7,593,991 B2
(45) Date of Patent: Sep. 22, 2009

(54) SYSTEMS AND METHODS FOR PROCESSING ATTACHMENTS ASSOCIATED WITH ELECTRONIC MESSAGES

(75) Inventors: Lee G. Friedman, Alpharetta, GA (US); Shayne Bowman, Cumming, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 770 days.

(21) Appl. No.: 10/911,870

(22) Filed: Aug. 5, 2004

(65) Prior Publication Data

US 2006/0031336 A1 Feb. 9, 2006

(51) Int. Cl.
*G06F 15/16* (2006.01)
(52) U.S. Cl. ........................................ 709/206; 715/717
(58) Field of Classification Search ................ 709/201, 709/203, 206, 232, 245, 205; 707/1, 102, 707/104.1; 715/500, 717; 348/207.2; 379/67.1, 379/88.14; 713/168; 370/282
See application file for complete search history.

(56) References Cited

U.S. PATENT DOCUMENTS

| | | | | |
|---|---|---|---|---|
| 5,771,355 A | * | 6/1998 | Kuzma | .................... 709/232 |
| 6,182,080 B1 | * | 1/2001 | Clements | .................... 707/102 |
| 6,360,252 B1 | * | 3/2002 | Rudy et al. | .................. 709/206 |
| 6,411,685 B1 | * | 6/2002 | O'Neal | ..................... 379/88.14 |
| 6,549,612 B2 | * | 4/2003 | Gifford et al. | ............... 379/67.1 |
| 6,564,321 B2 | * | 5/2003 | Bobo, II | ...................... 713/168 |
| 6,721,286 B1 | * | 4/2004 | Williams et al. | ............. 370/282 |
| 6,784,899 B1 | * | 8/2004 | Barrus et al. | ................. 715/717 |
| 6,993,594 B2 | * | 1/2006 | Schneider | .................... 709/245 |
| 7,080,099 B2 | * | 7/2006 | Tada et al. | ................. 707/104.1 |
| 7,130,885 B2 | * | 10/2006 | Chandra et al. | ............... 709/206 |
| 2003/0055905 A1 | * | 3/2003 | Nishiyama et al. | ............ 709/206 |
| 2003/0097408 A1 | * | 5/2003 | Kageyama et al. | ........... 709/205 |
| 2003/0140090 A1 | * | 7/2003 | Rezvani et al. | ............... 709/203 |
| 2004/0070673 A1 | * | 4/2004 | Nakamura | ................ 348/207.2 |
| 2004/0215696 A1 | * | 10/2004 | Fisher et al. | ................. 709/201 |
| 2006/0010095 A1 | * | 1/2006 | Wolff et al. | ..................... 707/1 |
| 2006/0224937 A1 | * | 10/2006 | Sudoh et al. | ................. 715/500 |

* cited by examiner

*Primary Examiner*—Dustin Nguyen
(74) *Attorney, Agent, or Firm*—Thomas, Kayden, Horstemeyer & Risley, LLP (57) ABSTRACT

Attachments that are received through one or more message transport services are processed. An object identifier is received through an electronic message received through one of a plurality of message transport services. A thumbnail graphic of a portion of the contents of the object associated with the object identifier is generated and displayed in a display window.

20 Claims, 6 Drawing Sheets

SYSTEMS AND METHODS FOR PROCESSING ATTACHMENTS ASSOCIATED WITH ELECTRONIC MESSAGES

TECHNICAL FIELD

The present disclosure is generally related to electronic messaging, and more particularly, is related to attachments in electronic messages.

BACKGROUND OF THE DISCLOSURE

Electronic messaging involves the transmission of electronic messages over computer networks, such as a local area network or the Internet. An electronic message may be a simple text message containing only ASCII, or it may be a complex message containing electronic files such as images, sounds, spreadsheets, etc. Electronic messaging is generally referred to as email, but it may also comprise other messaging technologies like instant messaging.

To send and receive electronic messages, electronic messaging clients are used. No matter which type of client is used, an electronic messaging client generally does at least the following tasks. It is able to show a list of all the messages in a user's Inbox by displaying information from message headers. The message header information often shows a user the address of each person who sent each message, the subject of each message, the time and date of each message, and the size of each message. The electronic messaging client also typically lets a user select a message header and read the body of the electronic message for that message header. Further, an electronic messaging client enables a user to create new messages and send them. In composing a message, a user typically is able to type in the email address of the recipient and the subject for the message, and then type the body of the message. Additionally, most clients permit a user to add attachments to messages that the user sends and to also save attachments from messages the user receives.

Specifically, an attachment is often an electronic file that can accompany an electronic mail message. The attachment can often be of any file format, such as word processing documents, spreadsheets, sound files, images, and other software. The attachment is often not simply text, but binary code. Otherwise, the attachment text could simply be added in the body of the message by the user creating the message. Accordingly, the original binary file structure of the attachment is often converted by an electronic messaging transport service, such as e-mail or Instant Messaging (IM), into a file version that only contains text characters so that the file may be transmitted over the Internet.

After an electronic mail with an attachment is received by an electronic messaging client, the client recognizes the type of attachment encoding and converts the attached file back to its binary form. To access this binary file, the recipient often needs an application installed on the recipient's computer that can execute or access that particular type of file. Often, in a Microsoft® Windows® environment, the application that is needed to execute the binary file is already associated (through an operating system association) with the filename extension of the binary file, so that a user's command to open the binary file will cause the application to access the binary file.

Figure 1:
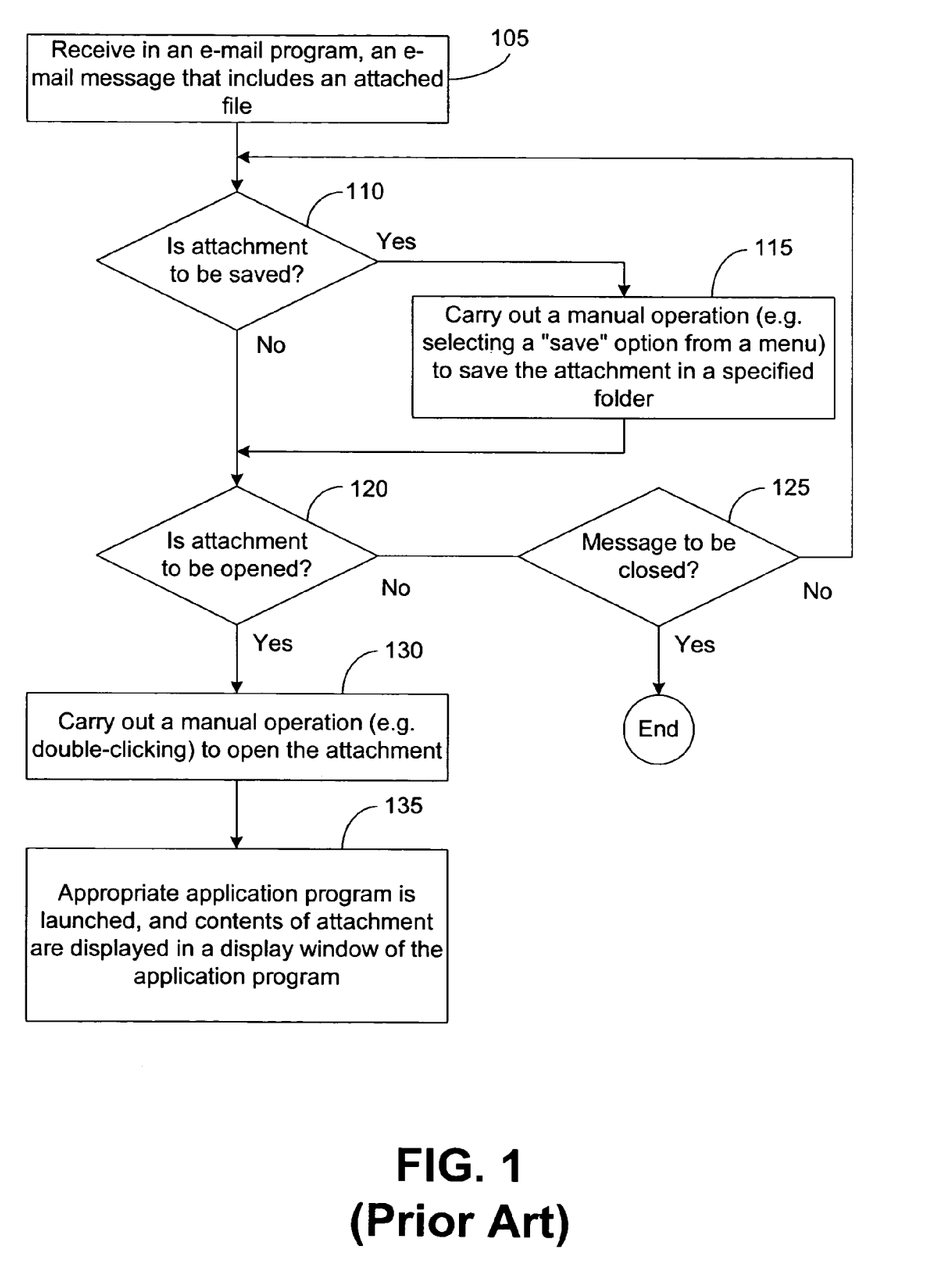
FIG. 1 is a flowchart illustrating a conventional method of handling attachments received in an e-mail.

FIG. 1 is a flowchart illustrating one method of handling attachments received in an e-mail. In block 105, an e-mail recipient operates a program, such as Microsoft® Outlook®, to receive an e-mail message that includes an attached file. Upon receiving this e-mail, the user has options of saving (decision block 110) or opening (decision block 120) the attachment. If the recipient decides to save the attachment, typically, the recipient manually selects a "save" option button from an options menu, followed by optionally specifying a particular directory in which the attachment is to be saved. This manual step is illustrated in block 115.

If the recipient decides to open the attachment, as determined in decision block 120, the recipient has to, typically, double-click on the attachment icon associated with the e-mail in the Microsoft® Outlook® mail program (illustrated in block 130). If an association is already present, the appropriate application program is launched, and the contents of the attachment are displayed in the launched application program (block 135). As one example of this step of block 135, double-clicking on an attachment that is a document associated with Microsoft® Word will cause Microsoft® Word to be launched, and the text of the attachment will be displayed inside a display window of the Microsoft® Word program.

Alternatively, in block 120, if the recipient decides to ignore the attachment momentarily, decision block 125 illustrates a step wherein the user decides to look at the attachment at a later date by closing the message or may leave the message open and return to it later.

In summary, electronic messaging clients, such as the Microsoft® Outlook® mail program, generally display and manage attachments in a similar manner. As explained above, to access an attachment in a received email message, a recipient typically has to know that a button, icon, or other element, needs to be selected followed by numerous other steps that may be involved in opening the attachment. While these traditional methods may be adequate for knowledgeable or experienced users of electronic mail clients or programs, a more straight forward and less arcane management structure is desired. Thus, a heretofore unaddressed need exists in the industry to address the aforementioned deficiencies and inadequacies.

SUMMARY OF THE DISCLOSURE

Exemplary embodiments of the present disclosure provide systems and methods for processing attachments that are received through one or more message transport services. Briefly described, one embodiment of a system, among others, includes a method comprising receiving an object identifier through an electronic message received through one of a plurality of message transport services, generating a thumbnail graphic of a portion of the contents of the object associated with the object identifier, and displaying in a display window, the thumbnail graphic. Other systems and methods are also provided.

Other systems, methods, features, and advantages of the present disclosure will be or become apparent to one with skill in the art upon examination of the following drawings and detailed description. It is intended that all such additional systems, methods, features, and advantages be included within this description, and the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

While the description below refers to certain exemplary embodiments, it is to be understood that the disclosure is not limited to these particular embodiments. On the contrary, the intent is to cover all alternatives, modifications and equivalents included within the spirit and scope of the disclosure. Also, the terminology used herein is for the purpose of description and not of limitation. As one example among many, while reference is made to a "communications element," it will be understood that there exists various terms, such as "e-mail client" and "instant messaging client" that can be used alternatively. In a second example, the term "electronic message" will be understood to encompass message-related data carried over one or more various transport mechanisms such as e-mail, instant messaging (IM), and peer-to-peer (P2P) systems, among others. Usage of such terms will be recognizable to persons of ordinary skill in the art.

Figure 2:
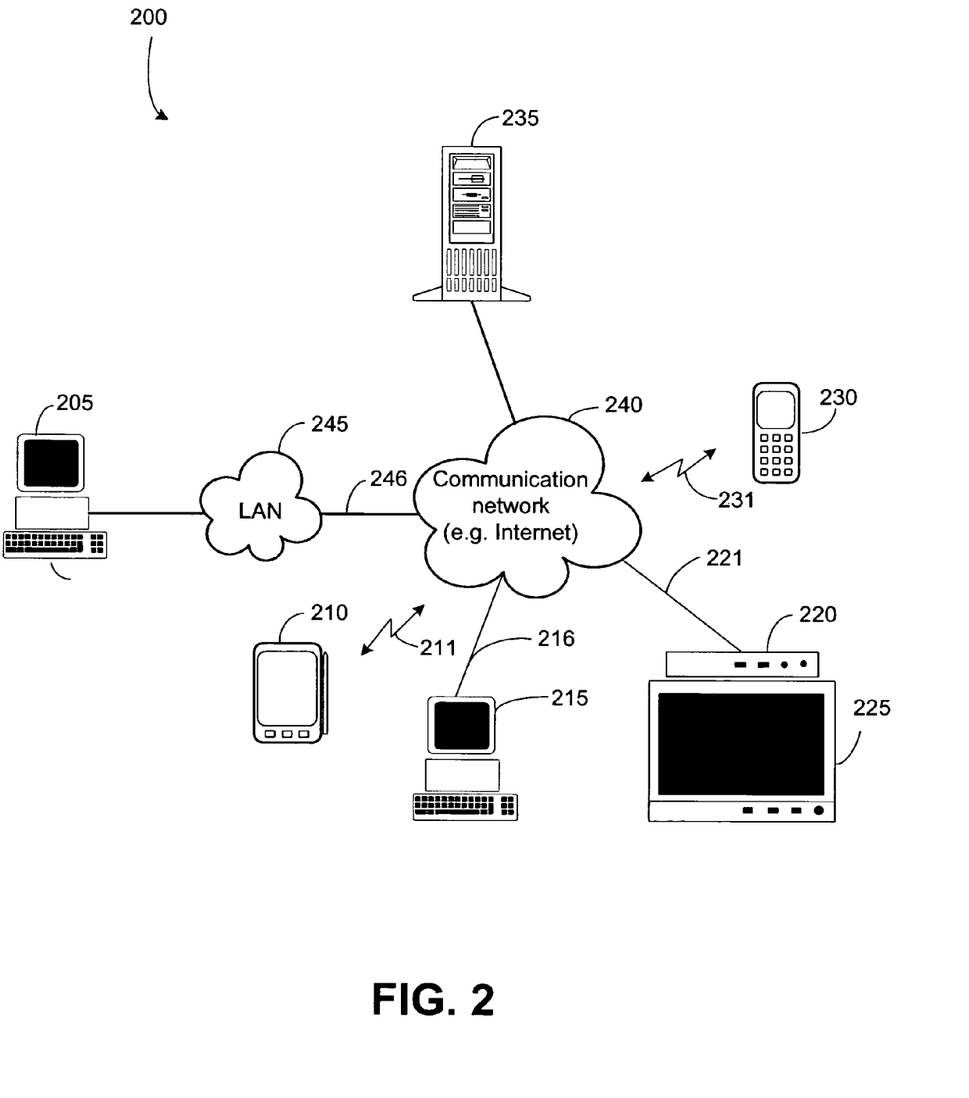
FIG. 2 is a block diagram of a communications system comprising various elements for exchanging electronic messages according to an exemplary embodiment.

Attention is now drawn to FIG. 2, which is a block diagram of a communications system 200 comprising various elements for exchanging electronic messages according to an exemplary embodiment. The Internet is one example among many, of a communications network 240, through which multiple communication elements are communicatively coupled. A few examples of such communication elements are shown in FIG. 2.

Corporate personal computer (PC) 205 is located in an office containing a local area network (LAN) 245 that interconnects multiple computers (not shown). LAN operation may be carried out using a server (not shown) that connects into the Internet 240 through link 246, which may be a high-speed connection, such as a fiber link or a digital T-1 link. PC 205 utilizes an operating system (e.g., Microsoft® Windows XP, Microsoft® Windows NT® among many others) to run various software programs for electronic messaging and programs for text and image-related operations. Some examples of electronic messaging programs include Microsoft® Outlook®, Eudora, and Netscape® while examples of programs for text and image-related operations include Microsoft® Word, Microsoft® Excel, Microsoft® Explorer, and Adobe® Acrobat®.

Home PC 215 connects into the Internet 240 via a link 216 that may include, among others, a dial-up connection, a digital subscriber line (DSL) link, or a cable connection. Home PC 215 uses an operating system and other software programs as was explained above with reference to corporate PC 205.

Wireless device 210 may be a personal digital assistant (PDA), a wireless computer, a wireless laptop, and a wireless e-mail device, which constitute a few examples among many, of such communication devices. Wireless device 210 transmits and receives electronic messages via the Internet 240 and a wireless link 211.

Set-top unit 220, which is typically located on a display device such as TV 225, is another example of a communication element that can be used to exchange electronic messages. In this example, set-top unit 220 is coupled to the Internet 240 via, e.g., a coaxial cable 221. TV 225 may be used to display received messages and also to interact with a suitable input/output (I/O) device such as a keyboard, to enter and transmit electronic messages via set-top unit 220.

A cellphone 230 is yet another example of a communication element that exchanges electronic messages, for example IM messages, with other communication elements via Internet 240. Link 231 comprises a cellphone network, details of which have been excluded in the interests of brevity.

Server 235, representative of multiple servers, is configured to provide Internet-related services to multiple client devices, such as the communication elements shown in FIG. 2. Server 235 contains network-related software and also network-based software, which in certain instances, may be downloaded into client devices. For example, a user of home PC 215, may download an Adobe Acrobat™ reader software that is located on server 235, so as to read documents that have been formatted in a pdf format. In a second example, the user may download a web browser software or an e-mail software program. Consequently, it will be understood that software described in this disclosure may be resident in several elements of the network, whether they be client devices or servers.

Figure 3:
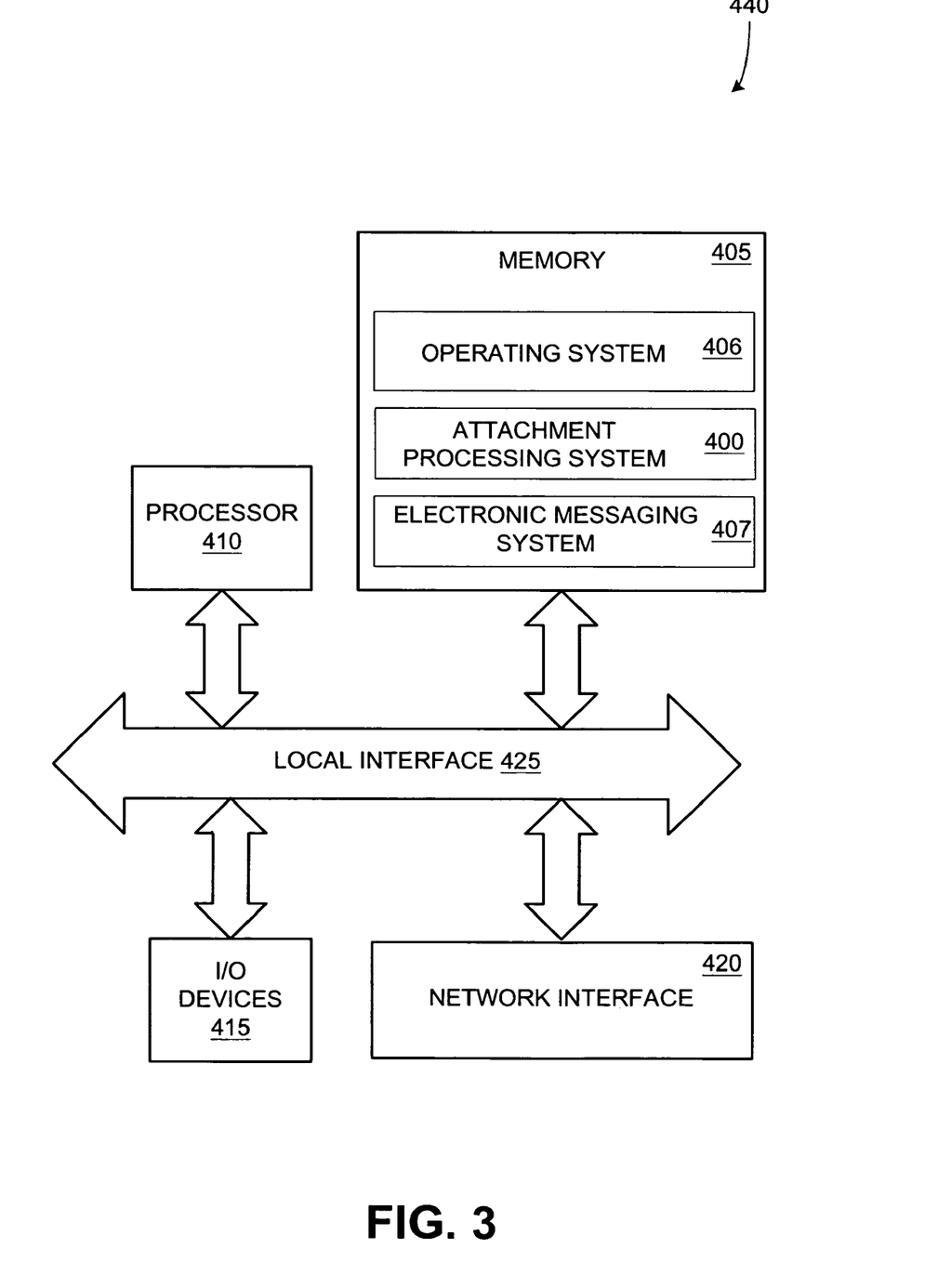
FIG. 3 is a block diagram of a system for processing attachments, including receiving, displaying, and transmitting attachments associated with electronic messages, according to an exemplary embodiment.

Attention is now drawn to FIG. 3, which is a block diagram of an attachment processing system for processing attachments associated with electronic messages. Such a system is, in various embodiments, located in a client device, a server device or a combination thereof. For example, the system is located in communication element 215 of FIG. 2, in one embodiment, and is located in server 235 in a second embodiment, and in a third embodiment, a first part of the system is located in communication element 215, while a second part is located in server 235. All such combinations are incorporated in this disclosure.

In one embodiment, the attachment processing system of the present disclosure is implemented in software, but other solutions also include firmware and hardware implementations. In one exemplary embodiment, the attachment processing system is implemented in software, as an executable program in combination with other program modules, and is executed as part of an electronic messaging client by a special or general purpose digital computer, such as a personal computer, workstation, minicomputer, or mainframe computer. An example of a general purpose computer 440 that implements the attachment processing system 400 of the preferred embodiment of the present disclosure is shown in FIG. 3.

Generally, in terms of hardware architecture, as shown in FIG. 3, the computer 440 includes a processor 410, memory 405, and one or more input and/or output (I/O) devices 415 (or peripherals) that are communicatively coupled via a local interface 425. The local interface 425 is, for example but not limited to, one or more buses or other wired or wireless connections, as is known in the art. Further, the local interface 425, in various embodiments, includes additional elements, which are omitted for simplicity, such as controllers, buffers (caches), drivers, repeaters, and receivers, to enable communications. Further, in various embodiments, the local interface includes address, control, and/or data connections to enable appropriate communications among the aforementioned components.

The processor 410 is a hardware device for executing software that is stored in memory 405. In various embodiments, the processor 410 may include any custom-made or commercially available processor, a central processing unit (CPU) or auxiliary processor among several processors associated with a computer 440, and a semiconductor based microprocessor (in the form of a microchip) or a macroprocessor.

In various embodiments, the memory 440 includes any one or combination of volatile memory elements (e.g., random access memory (RAM, such as DRAM, SRAM, etc.)) and nonvolatile memory elements (e.g., ROM, hard drive tape, CDROM, etc.). Moreover, the memory 440 incorporates, in various embodiments, electronic, magnetic, optical, and/or other types of storage media. Note that in certain embodiments, the memory 440 has a distributed architecture, where various components are situated remote from one another, but are accessed by the processor 410.

In exemplary embodiments, software in memory 405 includes one or more separate programs, each of which comprises an ordered listing of executable instructions for implementing logical functions. In the example of FIG. 3, the software in memory 405 includes the attachment processing system 400, an electronic messaging system 407, and an operating system (OS) 406. The operating system 406 controls the execution of other computer programs, and provides scheduling, input-output control, file and data management, memory management, and communication control and related services. The electronic messaging system 407 facilitates the transmission and reception of electronic messages, such as email and IM. In on embodiment among others, the attachment processing system 400 is a separate application that communicates with the electronic messaging client 407. Other embodiments include higher levels of integration, and some embodiments provide fully integrated solutions that provide a single interface system for providing the functionalities of multiple types of messaging clients and the consolidated attachment functions discussed herein.

In one exemplary embodiment, the attachment processing system 400 is a source program, executable program (object code), script, or any entity comprising a set of instructions to be performed. If the attachment processing system 400 is a source program, then the program needs to be translated via a compiler, assembler, interpreter, or the like, which may or may not be included within the memory 405, so as to operate properly in connection with the O/S 406. Furthermore, in various embodiments, the attachment processing system 400 is written as (a) an object oriented programming language, which has classes of data and methods, or (b) a procedure programming language, which has routines, subroutines, and/or functions, for example but not limited to, C, C++, Pascal, Basic, Fortran, Cobal, Perl, Java, and Ada. In addition, the attachment processing system 400, in some embodiments, is so integrated into the electronic messaging client 407 that there are not clear lines of separation, as might otherwise be suggested by the present disclosure.

In various embodiments, the I/O devices 415 includes input devices, for example but not limited to, a keyboard, mouse, scanner, digital camera, multi-function device, microphone, etc. Furthermore, the I/O devices 415 include output devices, for example but not limited to, a printer and a data transmitter. Finally, the I/O devices 415 further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 440 is a PC, workstation, or the like, the software in the memory 405 further includes a basic input output system (BIOS) (omitted for simplicity). The BIOS is a set of essential software routines that initialize and test hardware at startup, start the O/S 406, and support the transfer of data among the hardware devices. The BIOS is stored in ROM so that the BIOS can be executed when the computer 440 is activated.

When the computer 440 is in operation, the processor 410 is configured to execute software stored within the memory 405, to communicate data to and from the memory 405, and to generally control operations of the computer 440 pursuant to the software. The attachment processing system 400, the electronic messaging client 407, and the O/S 406, in whole or in part, but typically the latter, are read by the processor 410, perhaps buffered within the processor 410, and then executed.

The computer 440 operates, in an exemplary embodiment, in a networked environment using logical connections to one or more remote computers, such as a remote computer (not shown). In additional exemplary embodiments, the remote computer is a server, a router, a peer device or other common network node, and typically includes many or all of the elements described relative to the computer 440. The network interface 420 depicted in FIG. 3 includes, in various exemplary embodiments, a dial-up modem, network interface card, DSL modem, etc. that provides access to a messaging network such as the Internet.

When the attachment processing system 400 and electronic messaging client 407 are implemented in software, it should be noted that the attachment processing system 400 is stored on any computer readable medium for use by or in connection with any computer related system or method. In the context of this document, a computer readable medium is an electronic, magnetic, optical, or other physical device or means that contains or stores a computer program for use by or in connection with a computer related system or method. The attachment processing system 400 is embodied, in one embodiment among many, in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" is any means that can store, communicate, propagate, or transport the program for use by or in connection with the instruction execution system, apparatus, or device. The computer readable medium is, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that in certain embodiments, the computer-readable medium is paper or another suitable medium upon which the program is printed, as the program can be electronically captured, via for instance, optical scanning of the paper or other medium, then compiled, interpreted or otherwise processed in a suitable manner if necessary, and then stored in a computer memory.

In an alternative embodiment, where the attachment processing system 400 is implemented in hardware, the attachment processing system 400 is implemented with any combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
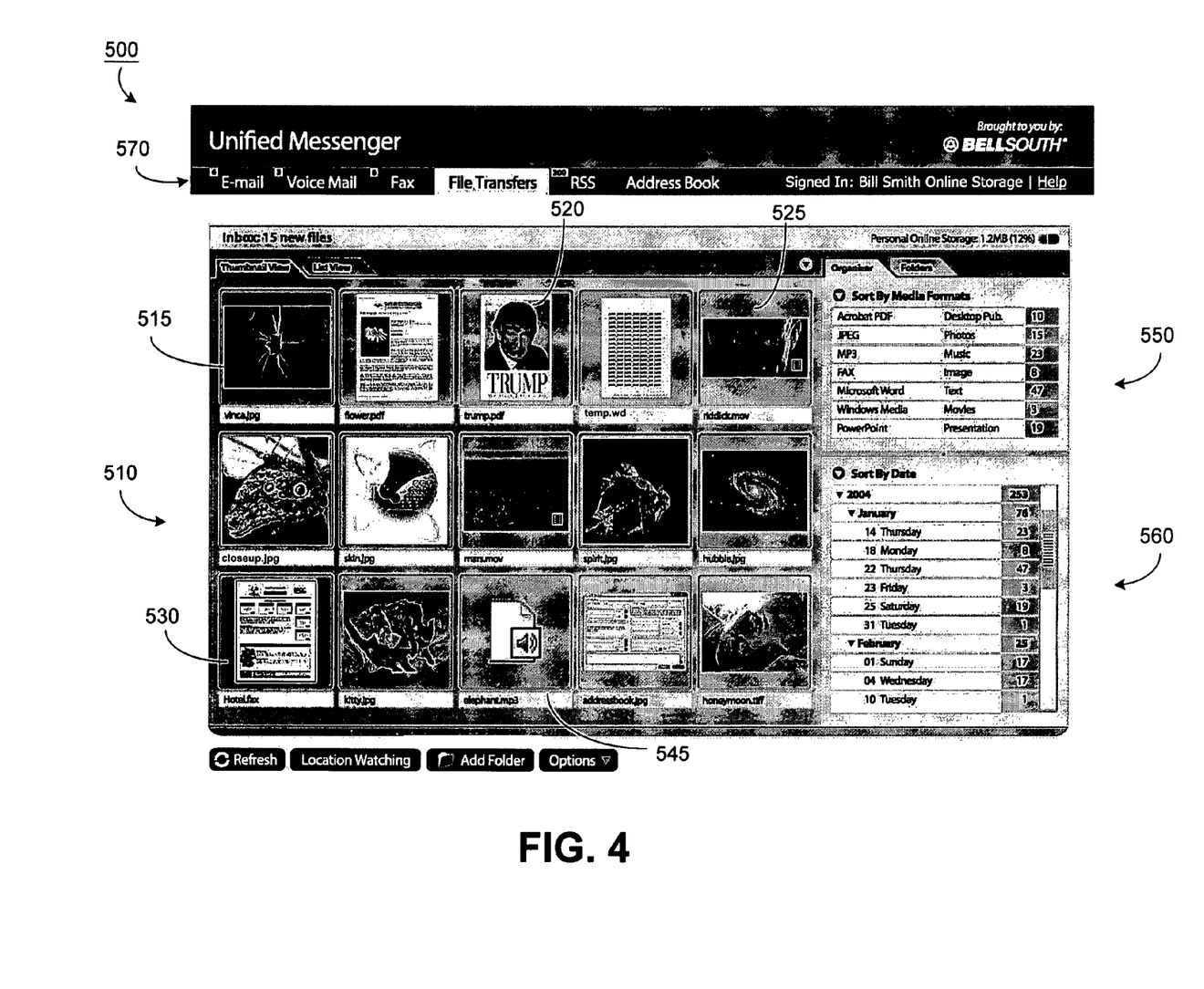
FIG. 4 illustrates one embodiment of a graphical user interface of an attachment processing system.

Attention is now drawn to FIG. 4, which illustrates one embodiment of a graphical user interface 500 of an attachment processing system. Display area 510 comprises a view of an Inbox that shows multiple thumbnail graphics that were received via multiple message transport services. Thumbnail graphic 515 is a representation of an image file, with a first object identifier—vinca.jpg, in a JPEG format, that has been received, for example, embedded inside an IM message.

Thumbnail graphic 520, having a first object identifier trump.pdf, represents a file in an Adobe® Acrobat® format, and has been received for example, as an attachment to an e-mail. Thumbnail graphic 525 has a riddick.mov first object identifier and comprises a thumbnail graphic representation of a video. Thumbnail graphic 530 represents a fax that has been electronically transmitted to the user, while thumbnail graphic 545 is an iconic representation of an audio file that was received, such as through a direct download.

It will be recognized that in addition to different formats, different transport services, and different identifiers, additionally, the objects represented by these thumbnail graphics may have originated and/or been received in a variety of devices such as PCs, PDAs, cellphones etc. as was explained earlier.

Display area 550 is one exemplary option wherein the user can opt to sort by media format so as to obtain an individual count of the total number of attachments in each individual format. Similarly, display area 560 is a second exemplary option wherein the user can sort based on date of receipt. It will be recognized that several alternative embodiments may be used to incorporate various such features in various such display manners.

Tabs section 570 shows multiple tabs, such as e-mail, voicemail, fax, RSS, and address book, that can be activated by clicking on them, so as to view, in one embodiment, e-mail related attachments, voicemail related attachments etc. In a second embodiment, these tabs may be operated to launch the associated programs, such as e-mail and address book.

Figure 5A:
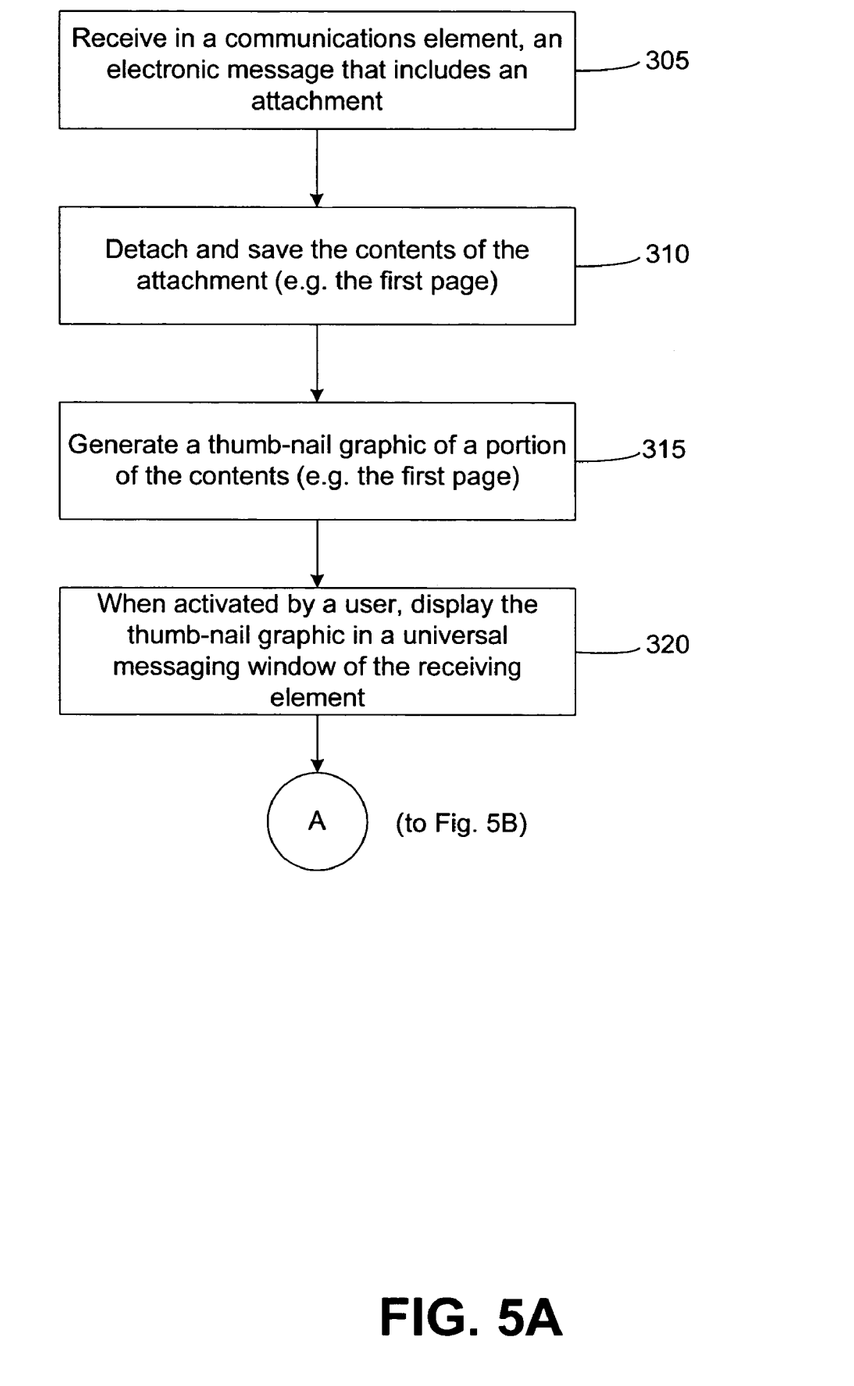
FIGS. 5A and 5B illustrate a flowchart describing a method for displaying attachments received via incoming electronic messages and for transmitting attachments via outgoing electronic messages according to an exemplary embodiment
Figure 5B:
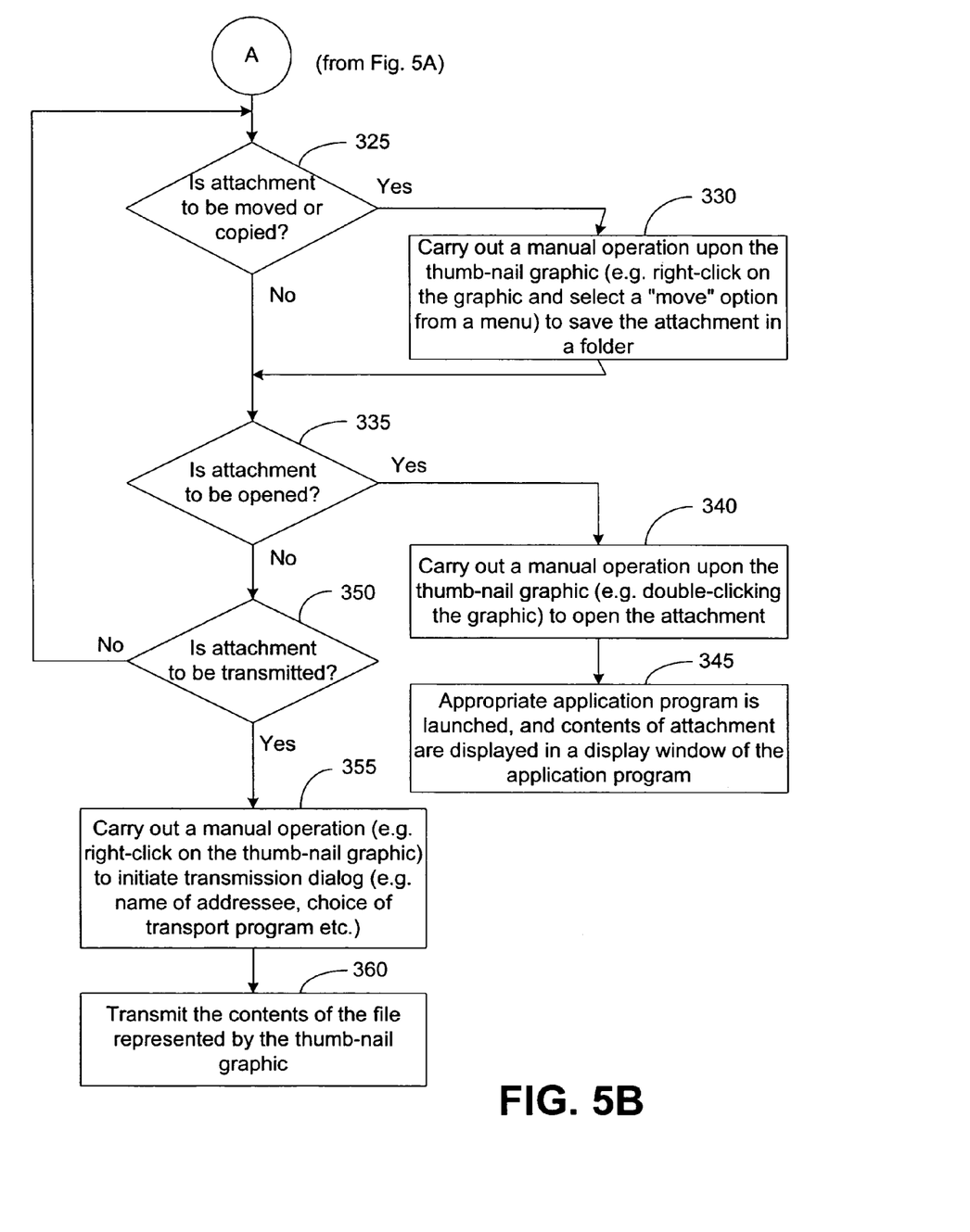

Attention is now drawn to FIGS. 5A and 5B, which show a flowchart describing a method for displaying attachments received via incoming electronic messages and for transmitting attachments via outgoing electronic messages. Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Referring first to FIG. 5A, in block 305, an electronic message is received in a communication element, such as a communication element of FIG. 2. In this example, the electronic message is referred to as an "e-mail message," but it will be understood that this is being done merely for explanation, and other electronic messages, such as but not limited to, IM messages, faxes, and voicemail are also included in this description.

Furthermore, as shown in block 305, the electronic message includes an "attachment." In this disclosure, the term "attachment" is to be construed as any object that is transported inside, outside, and/or along with, an electronic message. In this particular example the attached file may be, for example, a Microsoft® Word document having a file name "thesis.doc," wherein the Word document is referred to below as an "object," and the corresponding file name, "thesis.doc," is referred to as an "first object identifier."

Examples of "objects" include, but are not limited to a text file, an image file, a video file, an audio file, and a fax, individually or in combination. Such files are deemed to be "associated with" the electronic message, e-mail in this particular example, which is transporting these one or more files. Examples of "object identifiers" include, but are not limited to, a file name, a uniform resource locator (URL) such as a URL in a subject header of an e-mail, a URL embedded inside the text of an e-mail or IM message, and a URL located in an attached file.

In some cases, the term "attachment" will refer to "object identifiers" that are attached to electronic messages. One example, among many, of an attachment that is an object identifier, is a really simple syndication (RSS) pointer. The RSS pointer points to an object, which is, typically, a webpage. In this example, the webpage then constitutes the "object" that is pointed to by the object identifier. The RSS pointer is part of a Web content syndication format. RSS files are typically structured in conformance to an Extensible Markup Language (XML) standard.

Drawing attention once again to FIG. 5A, in block 310, the processing system of this disclosure, in one embodiment among many, automatically detaches and saves the contents of the object, partially or wholly, without any manual intervention on the part of the message recipient. At this stage, the user need not be necessarily operating an e-mail program for viewing the e-mail. It will be understood that such an automatic access is carried out irrespective of the type of the electronic message transport or the type of the attachment. Consequently, if the attachment is a text file, the system detaches the file and saves the contents of the text file, without necessarily launching the corresponding application program (e.g. Microsoft® Word). If the attachment is a URL, the system accesses the webpage that is pointed to by the URL, and saves the webpage, partially or wholly, in the recipient's computer. Again, this is carried out without the necessity of launching a web browser. It will be understood that the term "automatic" implies that the operation is carried out without necessitating the user to carry out a manual action for that particular operation, such as launching a software program, or operating an I/O device such as a keyboard or a mouse, among others.

While in one embodiment, the processing system of the disclosure may be automatically launched during power-up of a PC, in a second embodiment, the system may be initiated via a user input command that may be carried out subsequent to power-up. The user input command may be provided either before or after block 305 of FIG. 5A, in alternative embodiments.

In block 315, a thumbnail graphic is generated for a portion of the object, for example, the first page of a text document. If the accessed file is small, for example, less than a page, the entire contents are used for the thumbnail sketch. In the case of an attachment that is a URL or a RSS pointer for example, the system accesses the corresponding website and generates a thumbnail sketch of the web-page. The thumbnail graphic may also be referred to as a "second object identifier" since it is uniquely associated with the object, just like the first object identifier (the file name of the attachment) was also uniquely associated with the object when the object was received.

The processing system of the disclosure incorporates a graphical user interface, such as for example, graphical user interface 500 of FIG. 4. In one of various embodiments, the graphical user interface is displayed when initiated by the user of the communications element. In block 320, the thumbnail sketch will be displayed in a display area of the graphical user interface. Once the thumbnail graphic is displayed, the attachment is more easily operated upon by the user of the communications element. Consequently, if in block 325, the user desires to move or copy the attachment, in block 330, the user can more easily carry out a move or copy operation by acting upon the thumbnail graphic. While the "move/copy" operation is being carried out via the graphical user interface of this attachment processing system, rather than in a display system such as Windows® Explorer or Microsoft® Outlook®, it will be understood that existing methods that are used to carry out such operations (e.g. using a drop-down menu) can also be applied as usual.

In block 325, the user also has an option to open an attachment. This option is depicted in block 335. If the user chooses to open the attachment, a manual process, such as double-clicking, among others, may be carried out upon the thumbnail graphic. Again, while this "opening" operation is being carried out using the display of the attachment processing system, existing processes in other applications may also be applied to carry out this operation. Once the manual operation is completed, the appropriate application program is launched as shown in block 345.

Decision block 350 shows that the user also has an opportunity to transmit an attachment to another electronic message recipient. Several alternative mechanisms may be employed to carry out the operation of block 355. In one embodiment, right-clicking on the graphic launches an address book from which the user selects an addressee. Alternatively, a dialog box with a space for filling in an addressee's address may be provided. Optionally, other information, in addition to the addressee information is provided. Such information includes, for example, a message title, or a text message. It will be understood that the process of providing addressee and other information need not be carried out by launching of an e-mail program, but in a preferred embodiment, will be carried out inside the attachment processing system.

Once the information is provided, in one embodiment, the attachment processing system automatically selects one among several optional message transport services to transport the attachment. Such message transport services include e-mail, IM, and P2P, as some of several examples. In an alternative embodiment, the user is allowed to select one among several message transport services from inside the display window of the attachment processing system. Preferences of one service over another may be set by default by the system, or may be set based on user input. In one example, of a user-provided preference, the user may, as an example, be prompted to prioritize amongst three e-mail accounts that he uses, or prioritize between IM and e-mail, or prioritize among accounts with regard to particular recipients. Thereon, if the system is unable to use the first choice, it decides to use the alternative one instead. Selection of the transport services may also be carried out based upon the nature of the attachment. For example, if the attachment is a large text file, the first preference would comprise e-mail services, whereas if the attachment was a video file, a P2P service would be preferred.

When the attachment is transmitted, in one exemplary embodiment, the attachment is labeled using the original object identifier. In an alternative embodiment, a second object identifier may be used instead, and this second object identifier may comprise merely the thumbnail graphic whereby the receiver of the thumbnail graphic may then choose to access the original object through the thumbnail graphic.

It should be emphasized that the above-described embodiments of the present disclosure, particularly, any "preferred" and "exemplary" embodiments, are merely possible examples of implementations, merely set forth for a clear understanding of the principles of the disclosure. Many variations and modifications may be made to the above-described embodiment(s) of the disclosure without departing substantially from the principles of the disclosure. All such modifications and variations are intended to be included herein within the scope of this disclosure and the present disclosure and protected by the following claims.

What is claimed is:

1. A method for displaying at least a portion of the contents of an object associated with a first object identifier, the method comprising:
  receiving the first object identifier through an electronic message that is received through one of a plurality of message transport services, wherein electronic messages are received from the plurality of message transport services;
  accessing the portion of the contents of the object associated with the first object identifier, the object being received as an attachment of the electronic message;
  generating a thumbnail graphic of the portion of the contents of the object associated with the first object identifier; and
  displaying in a display window the thumbnail graphic with thumbnail graphics of other attachments that have been received from electronic messages through a same message transport service,
  wherein thumbnail graphics of attachments are able to be organized and displayed in accordance with a message transport service used to transport the respective attachments; and
  wherein the attachments are able to be sorted by media format type to obtain an individual count of a total number of attachments in each individual media format type.

2. The method of claim 1, wherein the first object identifier is a filename of a file that is attached to the electronic message, and the electronic message is at least one of an e-mail message, an electronic fax, and an instant message.

3. The method of claim 2, wherein the file is at least one of a text file, an image file, a video file, and an audio file.

4. The method of claim 3, wherein the thumbnail graphic shows at least one of a portion of the text file, a portion of the image file, a portion of the video file, an icon that is representative of the audio file.

5. The method of claim 1, wherein the electronic message is an e-mail, and the first object identifier is a uniform resource locator (URL).

6. The method of claim 5, wherein the step of accessing a portion of the contents comprises accessing a website of the URL, and wherein the step of generating the thumbnail graphic comprises generating a thumbnail view of the image at the website of the URL.

7. The method of claim 1, wherein the first object identifier is a really simple syndication (RSS) pointer.

8. The method of claim 7, wherein the step of accessing a portion of the contents comprises accessing a webpage identified by the RSS pointer, and wherein the step of generating the thumbnail graphic comprises generating a thumbnail view of the webpage identified by the RSS pointer.

9. The method of claim 1, further comprising:
accepting a command input from a user, wherein the command input is provided through a graphical user interface comprising the thumbnail graphic; and
transmitting the object to a remote recipient specified by the user as a part of the command input.

10. The method of claim 9, wherein the step of transmitting the first object identifier comprises:
automatically selecting one of multiple electronic message transport services.

11. The method of claim 9, wherein the step of transmitting the first object identifier comprises:
the user selecting one of multiple electronic message transport services.

12. The method of claim 9, further comprising:
transmitting the first object identifier together with the object.

13. An attachment processing system comprising:
a computer processor configured to execute:
a graphical user interface (GUI); and
a first thumbnail graphical representation of a first object received through one of a plurality of message transport services, wherein electronic messages are received from the plurality of message transport services, the first object comprising at least one of an attached file, a URL, and a RSS link, the first thumbnail graphical representation being displayed in a display window of the GUI with thumbnail graphics of other objects that have been received from electronic messages through a same message transport service,
wherein thumbnail graphics of objects are able to be organized and displayed in accordance with a message transport service used to transport the respective objects; and
wherein the attachments are able to be sorted by media format type to obtain an individual count of a total number of attachments in each individual media format type.

14. The system of claim 13, wherein the plurality of message transport services comprises e-mail, instant messaging, voicemail, fax, and P2P services.

15. The system of claim 14, wherein the GUI is operative to transmit the first object to an addressee that is specified by an operator of the GUI.

16. The system of claim 13, wherein the first object is received through a first transport service, and further comprising a second thumbnail graphic that is associated with a second object that is received through a second transport service, the second transport service being different than the first transport service.

17. An attachment processing system comprising:
a computer processor configured to execute computer logic, the computer logic comprising:
logic configured to access at least a portion of the contents of an attachment that has been received through one of a plurality of message transport services, wherein electronic messages are received from the plurality of message transport services;
logic configured to generate a thumbnail representation of the accessed contents; and
logic configured to display the thumbnail representation of the accessed contents with thumbnail representations of other attachments that have been received through a same message transport service,
wherein thumbnail representations of attachments are able to be organized and displayed in accordance with a message transport service used to transport the respective attachments; and
wherein the attachments are able to be sorted by media format type to obtain an individual count of a total number of attachments in each individual media format type.

18. The system of claim 17, further comprising:
logic configure to accept a user command through a user interface associated with the thumbnail representation; and
logic configured to transmit the attachment to a recipient specified by a user through the user command.

19. An attachment processing program stored on a computer-readable storage medium, the program comprising:
computer-readable code that accesses at least a portion of the contents of an attachment that has been received through one of a plurality of message transport services, wherein electronic messages are received from the plurality of message transport services;
computer-readable code that generates a thumbnail representation of the accessed contents; and
computer-readable code that displays the thumbnail representation of the accessed contents with thumbnail representations of other attachments that have been received through a same message transport service,
wherein thumbnail representations of attachments are able to be organized and displayed in accordance with a message transport service used to transport the respective attachments; and
wherein the attachments are able to be sorted by media format type to obtain an individual count of a total number of attachments in each individual media format type.

20. The program of claim 19, further comprising:
computer-readable code that accepts a user command through a user interface associated with the thumbnail representation; and
computer-readable code that transmits the attachment to a recipient specified by a user through the user command.

* * * * *